Patented Aug. 14, 1928.

1,680,941

UNITED STATES PATENT OFFICE.

HARRY C. FISHER, OF CINCINNATI, OHIO, ASSIGNOR TO THE RICHARDSON COMPANY, OF LOCKLAND, OHIO, A CORPORATION OF OHIO.

PROCESS OF COLORING MINERAL MATTER.

No Drawing. Application filed November 25, 1922. Serial No. 603,370.

My invention relates to processes for coloring mineral matter in a permanent manner, and more particularly to bonding into and onto a mineral body containing some ferrous or ferric constituents, a magnetic ferrite.

The selected illustration of the invention deals with a copper ferrite formed on the mineral with a view to forming colors varying from a yellowish red to a deep red of bluish nature, and from brownish black to black.

Watts, in his Dictionary of Chemistry, edition of 1889, vol. 2, page 547, says of ferrites: "Ferric oxide, $Fe_2O_3$ forms compounds with several metallic oxides more basic than itself. These compounds belong to the form $Fe_2O_3.M_2O$ and $Fe_2O_3.MO$, where $M_2$ is $K_2$ or $Na_2$ and M is Ba, Ca, Cu, Mg or Zn. They are analogous in composition to the aluminates, and may be regarded as metallic derivatives of the oxide $Fe_2O_4H_2$ or $Fe_2O_3.H_2O$.

A ferrite is a metallic oxide corresponding to the magnetic oxide of iron $Fe_3O_4=Fe_2O_3.FeO$ in which the FeO is replaced by an oxide such as that of copper, barium, zinc, etc., giving oxides of the formulæ $Fe_2O_3.CuO$, $Fe_2O_3.BaO$, $Fe_2O_3.ZnO$, etc. These compounds are magnetic and of hard and cementitious nature when acting as a coating, corresponding in this respect to the magnetic oxide of iron. They are usually highly resistant to acids and to other corrosive agents, and are insoluble in water and resistant to heat.

As such they form excellent pigmenting agents for such materials as crushed slate in roofs, pigmenting agents for infusorial earths and the like, and generally for any substance which will be able to withstand the heat necessary to form the ferrite.

It is known that ferric oxide will combine under fusion with certain metals, or, according to some writers, with the oxides of the said metals, these fused products being in my judgment better classed as metallic derivatives of the oxide $Fe_2O_3.H_2O$, the hydrogen being replaced by the metal. Among these metals, copper, which is bivalent, forms copper ferrite, the formula being $Fe_2O_3.CuO$, which is a brownish black crystalline, magnetic solid.

I have not in the ensuing disclosure referred to the colors attainable by the use of barium, calcium, magnesium, zinc, sodium, potassium or other metals having equivalent combining properties, and I have confined my specific illustration to colors attainable with the use of copper only, since the process described merely follows a known method of producing a ferrite with any one of the metals in the group noted, in a condition imposed on slate granules.

According to my process as particularly carried on for the production of a cementitious coating of copper ferrite, I provide means for producing the copper oxide on the material followed by production of the ferrite by adding an iron compound and then heating to a high degree or fusing.

According to my process I have worked out a commercial practice recommended by me as a compromise between best results and best and lowest manufacturing cost, which I give in detail.

Also my process, as it will be described, relates to slate, such as is used in surfacing roofing material. I find the fact that slate already contains material which will form ferrite group compounds upon heating from a high black heat up to fusing temperature, and that this in my opinion helps the permanent body which I obtain in my particular process to be described.

The slate which I have employed in the process to be described in detail is a green slate having an analysis as follows:

| | | Per cent. |
|---|---|---|
| Silica | ($SiO_2$) | 56.02 |
| Alumina | ($Al_2O_3$) | 21.61 |
| Ferric oxide | ($Fe_2O_3$) | 1.36 |
| Ferrous oxide | (FeO) | 5.97 |
| Lime | (CaO) | 1.22 |
| Magnesia | (MgO) | 2.96 |
| Potash | ($K_2O$) | 1.63 |
| Soda | ($Na_2O$) | 1.26 |

If this slate is heated at 1000 F. or higher, it will change in color to a pale red, and become magnetic in nature, showing the formation of ferrites, probably calcium and magnesium.

Taking the slate in a crushed state, it is immersed in a water solution of sufficient mass to cover it and containing two per cent by weight of hydrated copper sulphate of the weight of the slate. Hydrated copper sulphate ($CuSO_4.5H_2O$) is reduced to cupric oxide by heating at 735 C. (1356 F.).

I find that the weight of slate to that of water necessary to cover it is about 100:35.

The saturated mass is then boiled to near or complete dryness, resulting in the deposit of the copper sulphate upon the slate and partial penetration thereof into the slate.

The mass is then ignited for ten minutes in an oxidizing flame at 1300–1400 F. I find that as compared to the particular slate when ignited without the copper compound, the slate when ignited with the copper imposed upon and in it, there are more ferrites formed in the latter case than the former. In addition to this there is cupric oxide upon the entire surface of the slate particles.

Upon removing the ignited mass from the furnace it is immediately dropped into a fifteen per cent solution of hydrated ferrous sulphate ($FeSO_4 \cdot 7H_2O$) based upon weight of the slate. Again the mass is boiled near to or to complete dryness and is re-fired in an oxidizing flame at 1300 F. for ten minutes; then cool the slate in air.

This second step of firing results in the hydrated sulphate being reduced and the copper oxide formed into a ferrite.

The resultant slate is colored brownish black, if the exact process above set forth is followed where the proportions are so arranged that pure copper ferrite is formed with no excess of copper oxide or of iron oxide.

If there is included more iron oxide than called for in the precise steps set forth, then the color will vary from yellowish to purplish red. If there is an excess of the copper oxide, then the color will vary from brownish black to black.

The red mixture of ferric oxide and copper ferrite, or darker mixture of cupric oxide and copper ferrite, can be applied successfully to any surface in which ferrites can be formed by adjusting the concentrations of chemicals to suit the conditions of composition of material, surface, and resultant color of initial material upon ignition. For example, a material which whitens upon ignition will necessitate a larger proportion of cupric oxide, to give a dark red, than a material which darkens when similarly heated. Again, a given weight of material in one piece will require a smaller amount of reagents than the same weight of material ground into small pieces. Also, given two solid substances, the one containing more elements available for forming ferrites will necessitate the smaller proportion of chemicals.

The copper-iron method of coloring slate is applicable to material other than slate of any color, provided the ignitions at high temperatures do not destroy them. For example, white granulated marble can be colored red by this method, but the ignitions destroy the marble.

Instead of using two solutions and ignitions to produce the red color on slate, the process can be performed in one operation: i. e. both the salts dissolved in one solution and after boiling to dryness, one ignition made. An investigation of this single solution method showed results to be much less satisfactory than the use of double solutions and ignitions.

By adding the ferrous sulphate first, then the copper sulphate, a red slate can be produced. However, the color is very easily removed by washing with water.

Thus by my process a coloring matter is added to a mineral product, which matter is very closely adherent and impervious, and gives a very desirable range of colors which can be readily controlled. In treating slate the dust which is screened off before coating roofing products with the material may be used as a pigment for paints, particularly water-proof paints, and this will form a valuable by-product in the use of my process in the roofing factory or slate mill.

Having thus described by invention, what I claim as new and desire to secure by Letters Patent, is:—

1. That process of coloring mineral matter which consists in forming a ferrite at the surface thereof said ferrite composed of materials extremely applied to the mineral matter.

2. That process of coloring mineral matter which consists in heating or fusing on the surface of the material, iron oxide and a metallic body whose oxide can combine with ferric oxide to give a ferrite.

3. That process of coloring mineral matter which consists in heating on the surface of the material, iron oxide and cupric oxide in desired proportions to cause fusion or like reaction.

4. That process of coloring mineral matter which consists in first forming on the surface thereof, a coating of a metal oxide and then adding a coating of iron oxide and fusing to form a ferrite of the two coatings.

5. That process of coloring mineral matter which consists in forming oxides of iron and a mineral thereon by boiling the mineral matter in disssolved hydrated sulphates of the iron and the mineral and firing the mass to reduce the sulphates to oxides and form magnetic ferrites in desired proportions.

6. That process of coloring mineral matter which consists in first forming on the surface thereof, a coating of a copper oxide, and then adding an iron oxide and heating or fusing to form a copper ferrite on the mineral with or without excess of either oxide, dependent upon the final color desired.

7. That process of coloring mineral matter which consists in immersing the mineral in a bath of dissolved hydrated sulphate of a desired metal, such as copper, then boiling to or near dryness, then firing to reduce the sulphate to an oxide of the metal, then immersing the mineral in a bath of hydrated iron sulphate, boiling to or near dryness and a second time firing to reduce the iron sulphate to oxide and form a ferrite of the metal oxide, the color varying upon the excess of either oxide.

8. That process of coloring crushed slate which consists in forming upon the slate a superimposed coating of ferrite, said ferrite composed of materials externally applied to the slate.

9. That process of coloring crushed slate which consists in heating or fusing on the surface of the material, iron oxide and cupric oxide in desired proportions.

10. That process of coloring crushed slate which consists in first forming on the surface thereof a coating of a copper oxide, and then adding an iron oxide and heating or fusing to form a copper ferrite on the slate with or without excess of either oxide, dependent upon the final color desired.

HARRY C. FISHER.